United States Patent
Bauder

(10) Patent No.: US 7,950,678 B1
(45) Date of Patent: May 31, 2011

(54) TRAILER LEVELING SYSTEM

(76) Inventor: Jerrlyn K. Bauder, Huron, SD (US)

( * ) Notice: Subject to any disclaimer, the term of this patent is extended or adjusted under 35 U.S.C. 154(b) by 175 days.

(21) Appl. No.: 12/398,658

(22) Filed: Mar. 5, 2009

(51) Int. Cl.
B62D 61/12 (2006.01)
B60G 5/047 (2006.01)
B60G 11/04 (2006.01)

(52) U.S. Cl. ............... 280/43.18; 280/682; 280/686; 280/124.17

(58) Field of Classification Search ........... 280/5.514, 280/6.153, 6.157, 124.11, 124.17, 43.17–43.23, 280/682, 686; 267/36.1, 40
See application file for complete search history.

(56) References Cited

U.S. PATENT DOCUMENTS

| | | | | |
|---|---|---|---|---|
| 2,451,293 | A | * | 10/1948 | Long ........................... 280/682 |
| 2,453,388 | A | * | 11/1948 | Schramm .................... 280/43.18 |
| 2,698,186 | A | * | 12/1954 | Pehl ............................... 280/43 |
| 2,774,604 | A | * | 12/1956 | Rendel et al. ............... 280/43.11 |
| 2,853,325 | A | * | 9/1958 | Ward ............................ 280/682 |
| 2,940,768 | A | * | 6/1960 | Thompson et al. ......... 280/43.18 |
| 3,102,734 | A | * | 9/1963 | Sittel ........................... 280/43.19 |
| 3,147,023 | A | * | 9/1964 | Raymo ....................... 280/43.23 |
| 3,384,384 | A | | 5/1968 | Diehl |
| 3,427,041 | A | * | 2/1969 | Nichols ...................... 280/43.18 |
| 3,429,585 | A | * | 2/1969 | Ross ............................ 280/441.2 |
| 3,494,630 | A | | 2/1970 | Smith |
| 3,533,641 | A | | 10/1970 | Driskill |
| 3,578,352 | A | * | 5/1971 | Heine ......................... 280/43.23 |
| 3,659,671 | A | | 5/1972 | Heinze |
| 3,856,319 | A | | 12/1974 | Hardy |
| 3,860,256 | A | | 1/1975 | Jackson |
| 4,058,325 | A | * | 11/1977 | Schramm .................... 280/43.18 |
| 4,102,424 | A | | 7/1978 | Heinze |
| 4,134,604 | A | | 1/1979 | Jackson |
| 4,302,022 | A | * | 11/1981 | Schoeffler et al. .......... 280/43.19 |
| 4,379,571 | A | * | 4/1983 | Simmons ...................... 280/656 |
| 4,513,984 | A | | 4/1985 | Wright |
| 4,619,578 | A | | 10/1986 | Routledge |
| 4,921,262 | A | | 5/1990 | Svitak |
| 5,129,671 | A | | 7/1992 | Walton |
| 6,857,643 | B2 | * | 2/2005 | Neider ........................ 280/43.18 |
| 6,951,343 | B2 | | 10/2005 | Hildebrand |
| 7,775,529 | B2 | * | 8/2010 | Kinkaide .................... 280/6.153 |

* cited by examiner

Primary Examiner — Paul N Dickson
Assistant Examiner — Laura Freedman
(74) Attorney, Agent, or Firm — Jeffrey A. Proehl; Woods, Fuller, Shultz & Smith, PC

(57) ABSTRACT

A trailer leveling system for adjusting a height of a frame of a trailer above a ground surface is disclosed. The trailer leveling system comprises at least one trailer leveling apparatus configured to adjust a distance between an axle of the trailer and the frame of the trailer. The at least one trailer leveling apparatus acts on a suspension of the trailer. The at least one trailer leveling apparatus moving the suspension between a traveling position and a leveling position, with the traveling position being characterized by the suspension being capable of supporting the frame during movement of the trailer along a road and the leveling position being characterized by a portion of the suspension being moved away from the frame with respect to the travel position.

14 Claims, 10 Drawing Sheets

TRAILER LEVELING SYSTEM

BACKGROUND

1. Field

The present disclosure relates to leveling systems and more particularly pertains to a new trailer leveling system that is suitable to be integrated into newly manufactured trailers as well as being retrofit onto previously manufactured trailers.

2. Description of the Prior Art

Trailers, such as travel trailers or recreational camper trailers, are moved from location to location and utilized as living quarters at each new location. The topography of the ground surface at each location may not be perfectly flat and level, and it is desirable to bring the trailer into a horizontally level condition at each location, if possible, so that doors swing normally, sinks drain, horizontal surfaces in the trailer are not tilted out of level, and in general living in the trailer is not adversely affected.

However, known systems for leveling trailers tend to be bulky and complicated, require that the systems be integrated into the trailers at the time of manufacture, and are not easily retrofitted to the trailer thereafter.

It is therefore believed that there is a need for a system for leveling a trailer that may be applied to the trailer at the time of manufacture as well as after the time of manufacture, and is simple and less bulky.

SUMMARY

In view of the foregoing disadvantages inherent in the known types of leveling systems now present in the prior art, the present disclosure describes a new trailer leveling system which may be utilized for integrating into newly manufactured trailers as well as retrofitting onto previously manufactured trailers.

The present disclosure relates to a trailer leveling system for adjusting a height of a frame of a trailer above a ground surface. The trailer leveling system comprises at least one trailer leveling apparatus configured to adjust a distance between an axle of the trailer and the frame of the trailer. The at least one trailer leveling apparatus acts on a suspension of the trailer. The at least one trailer leveling apparatus moves the suspension between a traveling position and a leveling position. The traveling position is characterized by the suspension being capable of supporting the frame during movement of the trailer along a road, and the leveling position is characterized by a position of the suspension being moved away from the frame with respect to the travel position.

There has thus been outlined, rather broadly, some of the more important elements of the invention in order that the detailed description thereof that follows may be better understood, and in order that the present contribution to the art may be better appreciated. There are additional elements of the invention that will be described hereinafter and which will form the subject matter of the claims appended hereto.

In this respect, before explaining at least one embodiment or implementation in greater detail, it is to be understood that the scope of the invention is not limited in its application to the details of construction and to the arrangements of the components, as well as the particulars of the steps of usage, set forth in the following description or illustrated in the drawings. The invention is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present invention.

The advantages of the various embodiments of the present invention, along with the various features of novelty that characterize the invention, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
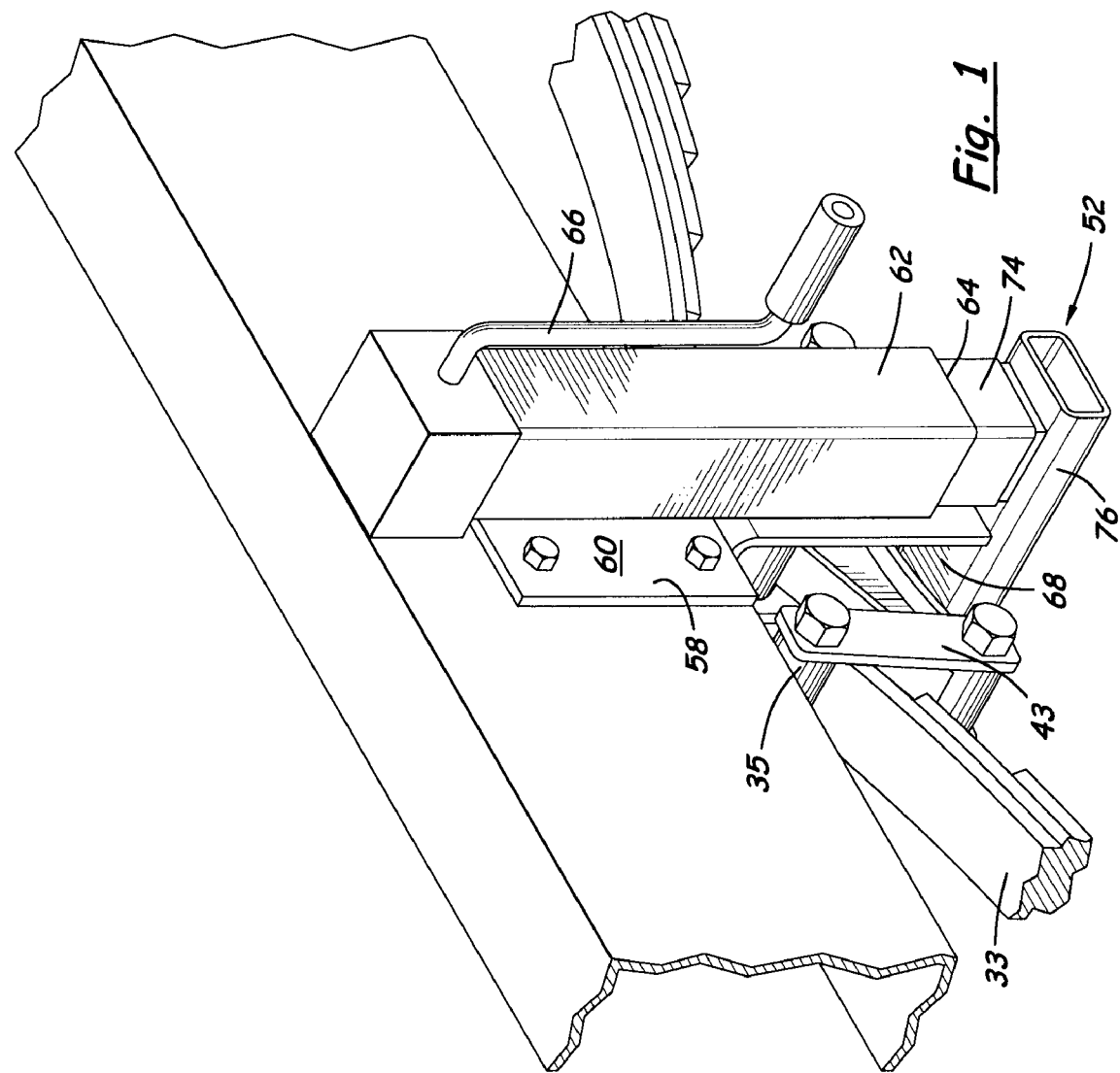
FIG. 1 is a schematic perspective view of a new trailer leveling system according to the present disclosure.
Figure 2:
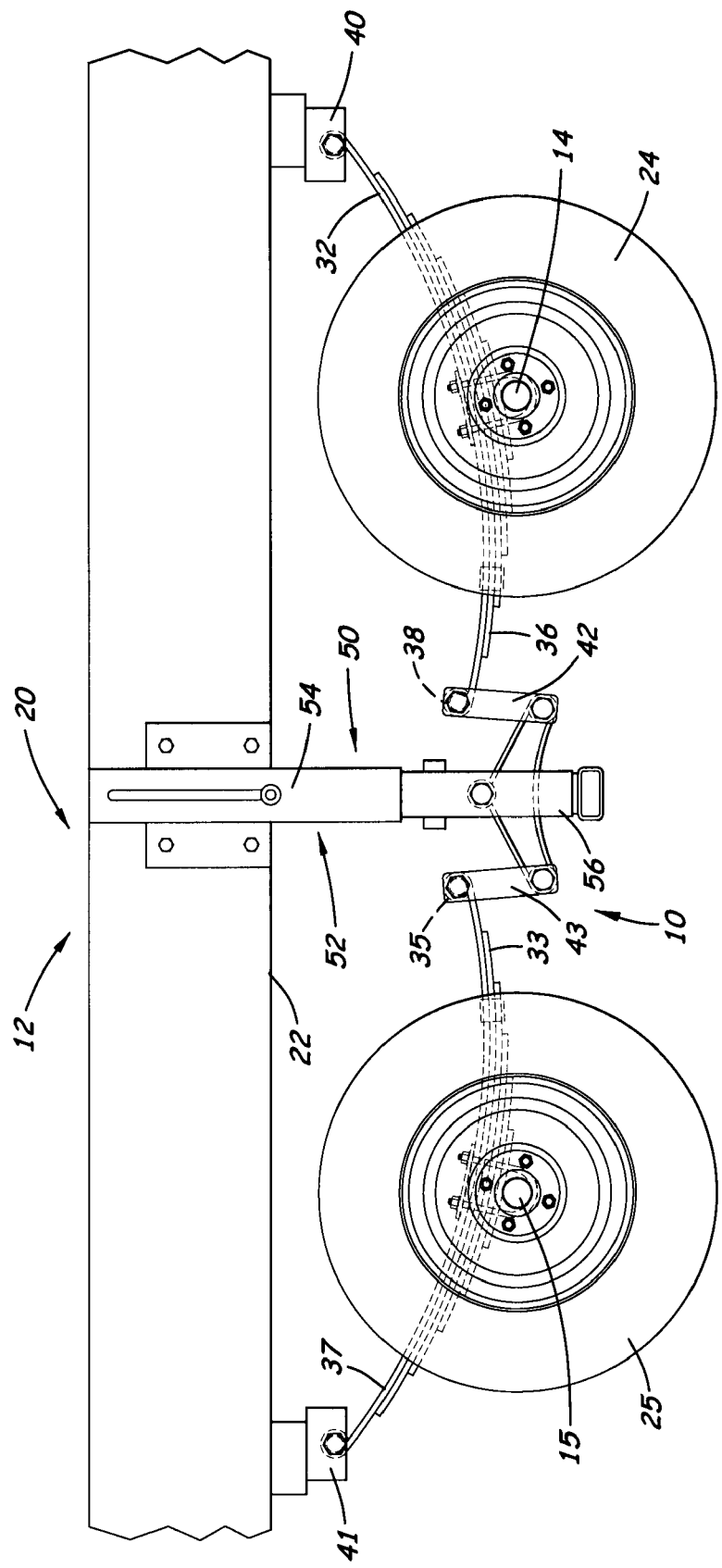
FIG. 2 is a schematic side view of the trailer leveling system in a leveling position and viewed from an outer side of the frame member.
Figure 3:
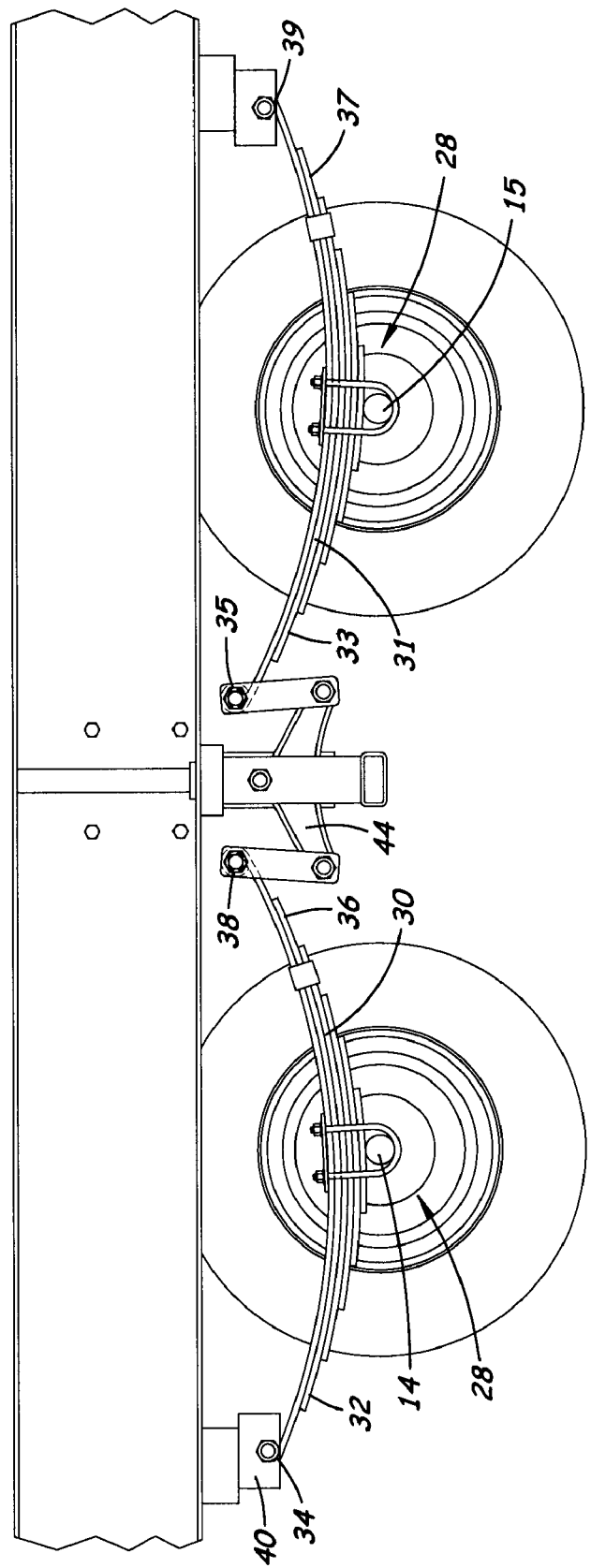
FIG. 3 is a schematic side view of the trailer leveling system in a traveling position and viewed from an inner side of the frame member.
Figure 4:
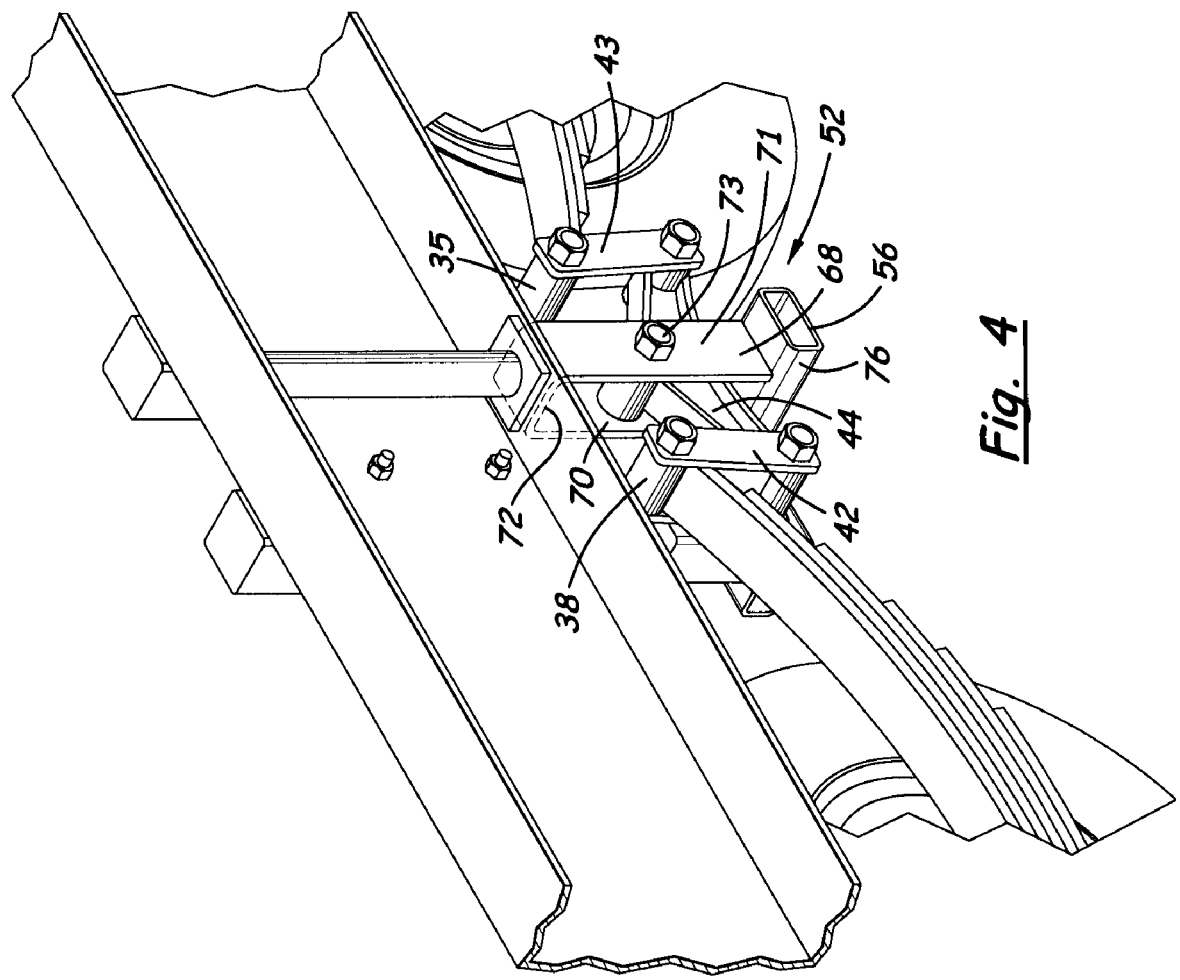
FIG. 4 is a schematic side view of the optional embodiment of the trailer leveling assembly in a traveling position as viewed from the inner side of the frame member.
Figure 5:
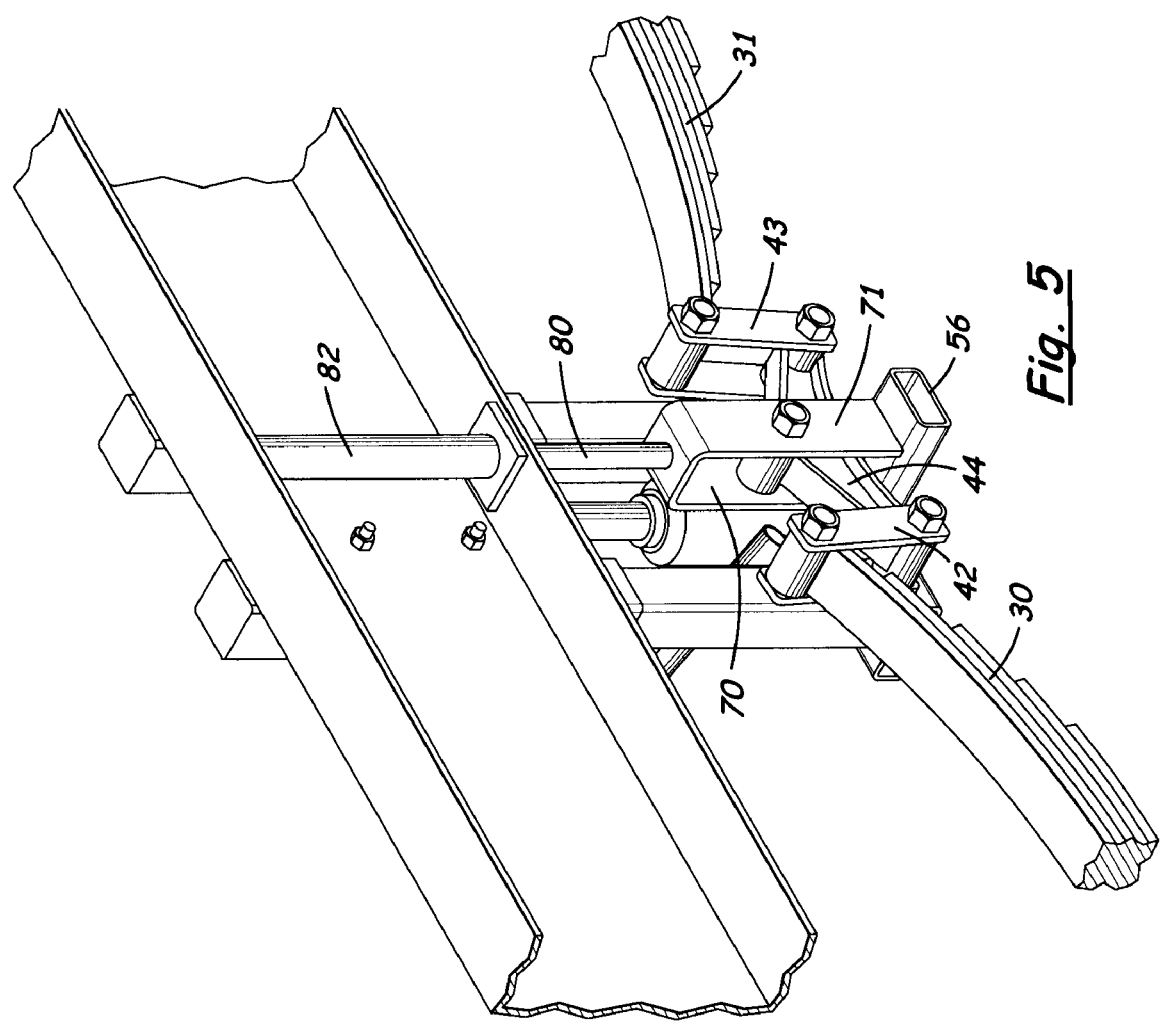
FIG. 5 is a schematic side view of the optional embodiment of the trailer leveling assembly shown in FIG. 4 as viewed from the inner side of the frame member and in the leveling position.
Figure 6:
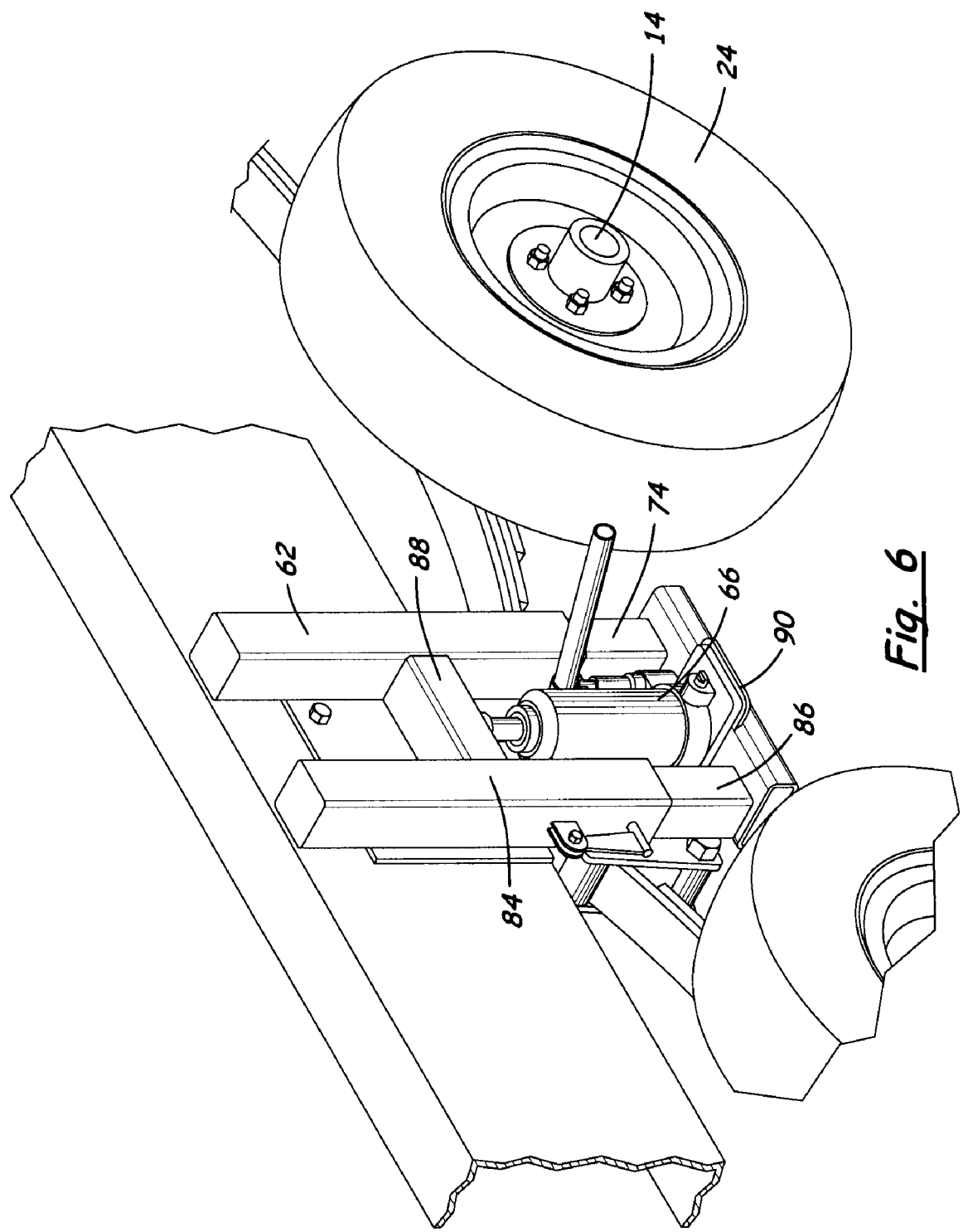
FIG. 6 is a schematic side view of the optional embodiment of the trailer leveling assembly shown in FIG. 4 viewed from the outer side of the frame member and in the traveling position.
Figure 7:
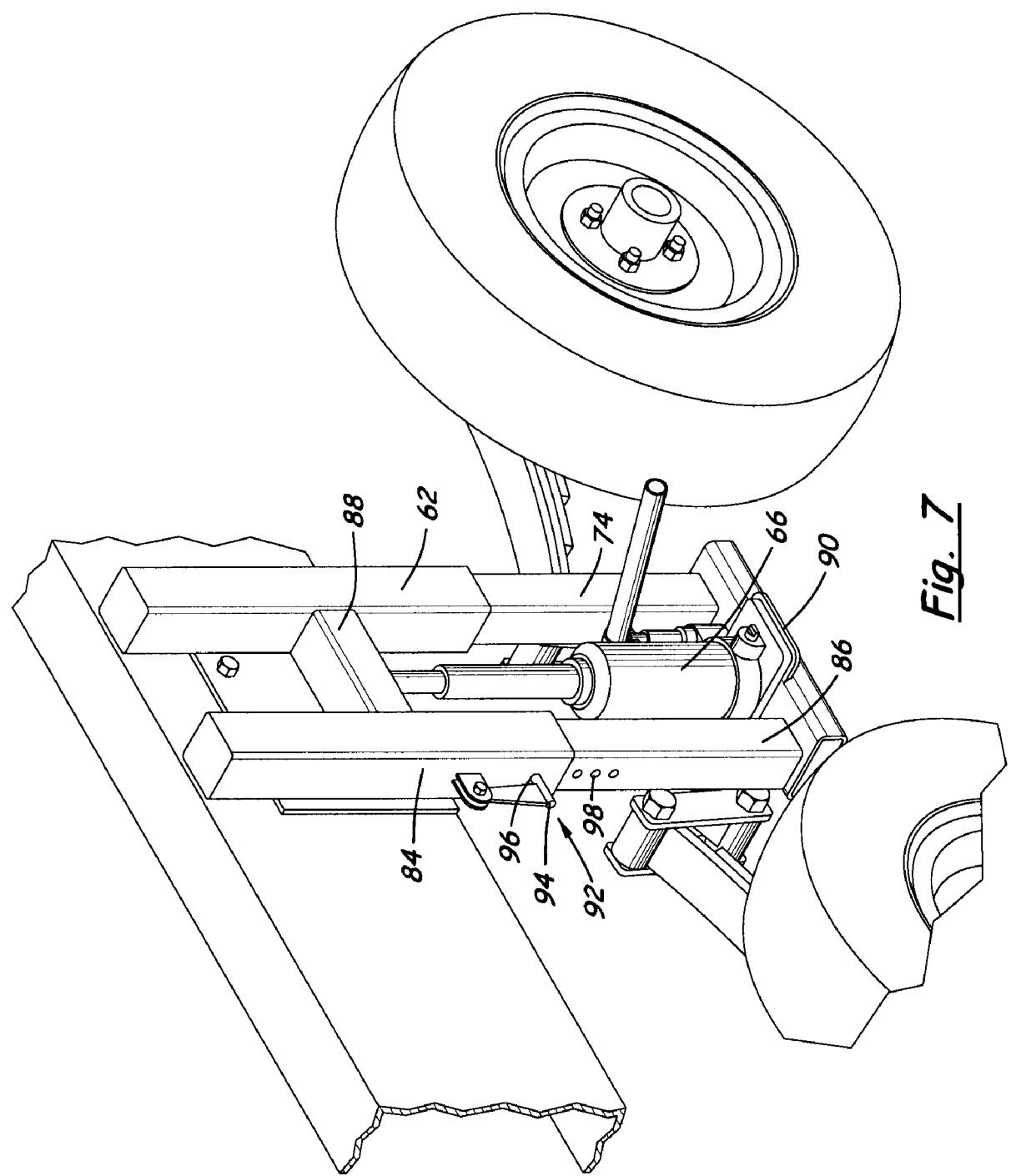
FIG. 7 is a schematic side view of the optional embodiment of the trailer leveling assembly shown in FIG. 4 viewed from the outer side of the frame member and in the leveling position.
Figure 8:
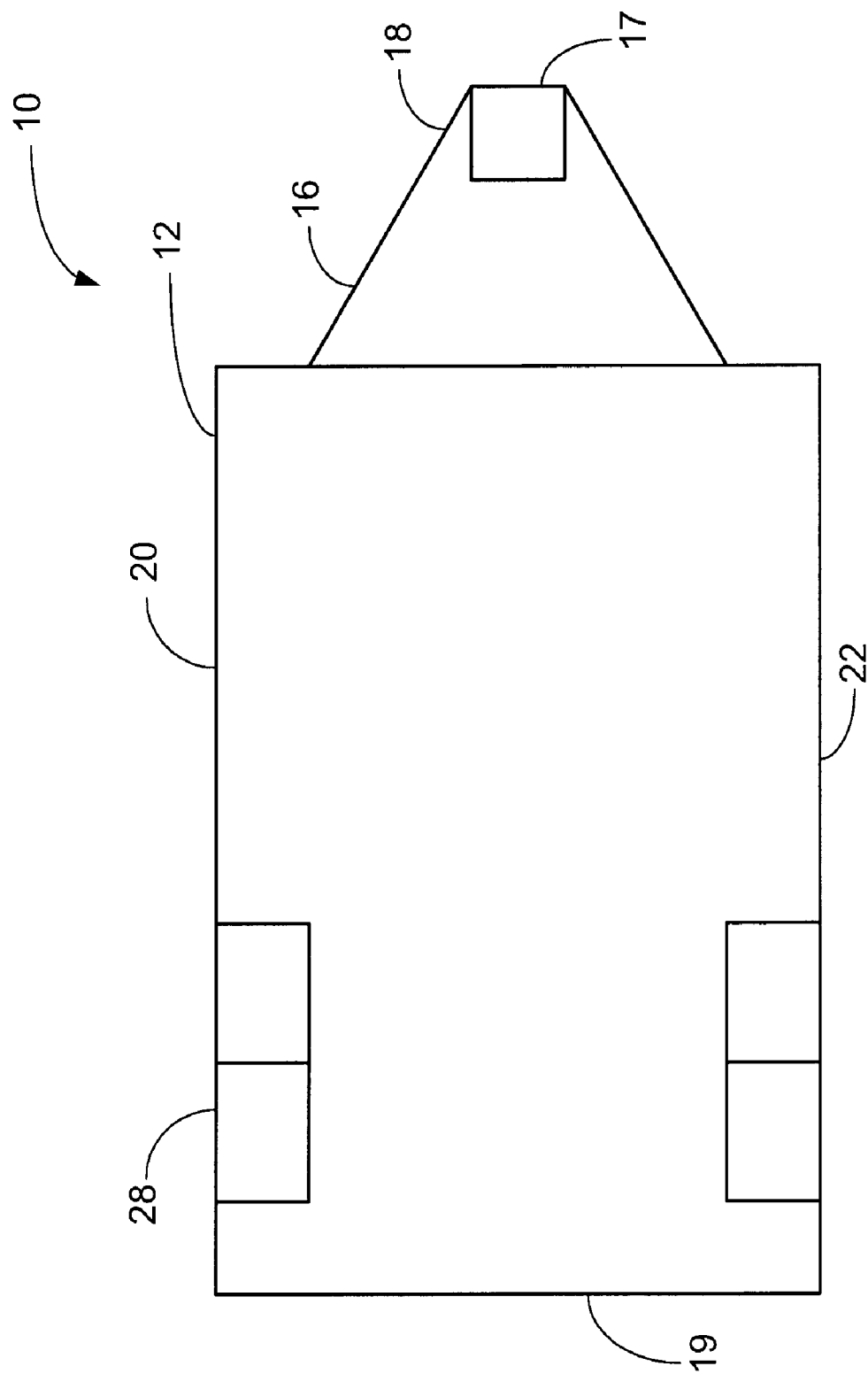
FIG. 8 is a schematic top diagrammatic view of a trailer suitable for employing the system of the present disclosure.
Figure 9:
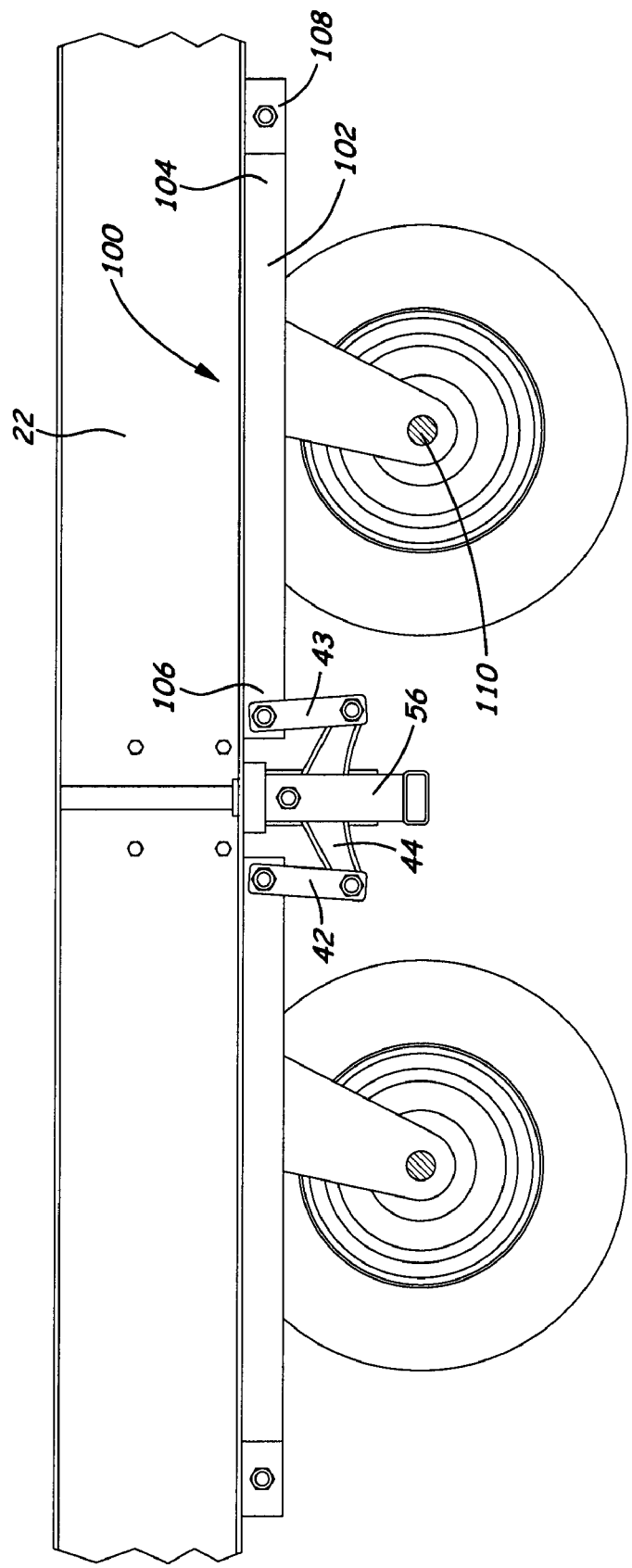
FIG. 9 is a schematic side view of another optional embodiment of the trailer leveling assembly viewed from the inner side of the frame member and in the traveling position.
Figure 10:
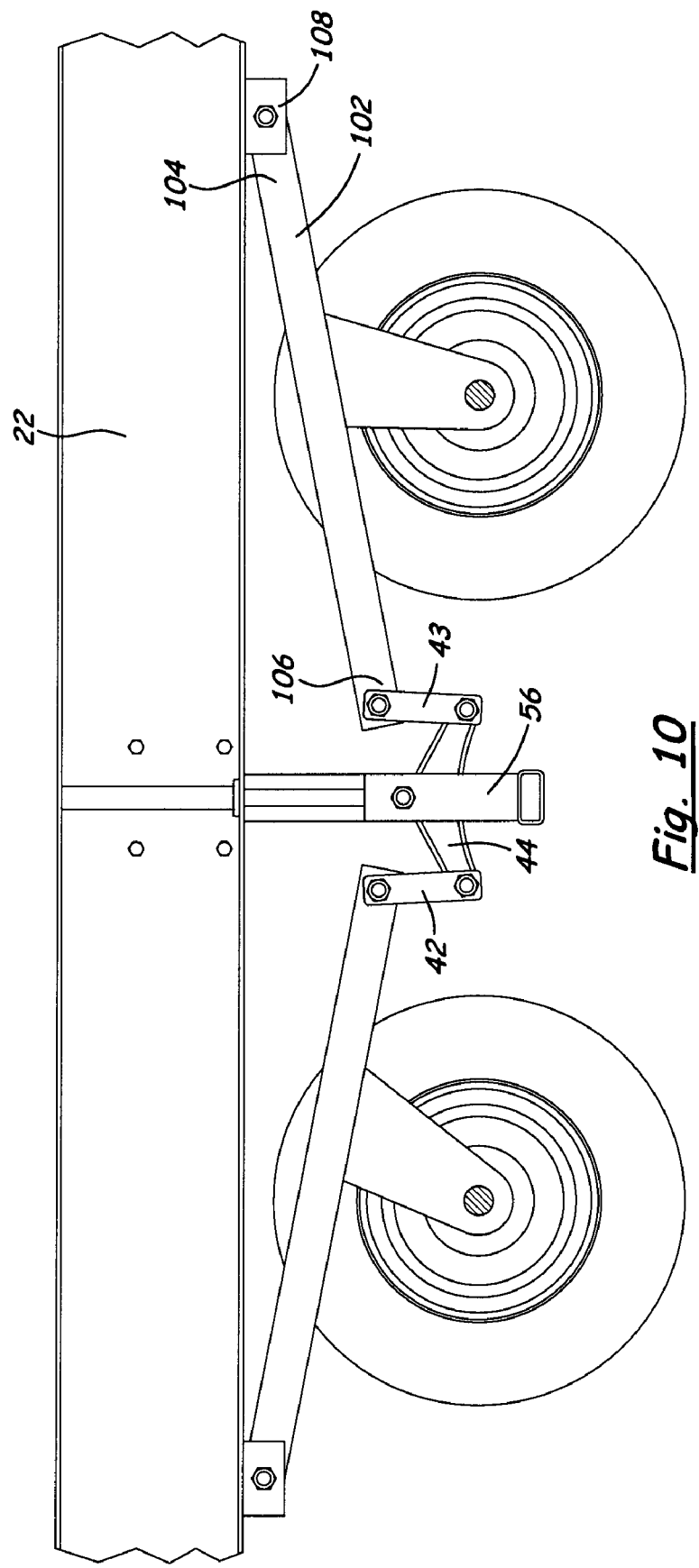
FIG. 10 is a schematic side view of the optional embodiment of the trailer leveling system shown in FIG. 9 viewed from the inner side of the frame member and in the leveling position.

With reference now to the drawings, and in particular to FIGS. 1 through 10 thereof, a new trailer leveling system embodying the principles and concepts of the disclosed subject matter will be described.

The disclosure relates to a trailer leveling system 10 that functions to level a trailer that may be located on ground that is not level with the horizontal, or the plane of the horizon. The trailer leveling system 10 is highly suitable for use with trailers 12 such as travel trailers, although its use is not limited to such trailers, and may be used on trailers that are utilized for carrying cargo or other purposes. The system 10 is generally useful on trailers that are supported by one 14 or two 14, 15 (or more) axles located toward one end of the trailer, and a tongue 16 located toward an end of the trailer opposite of the end having the axles. A tongue jack 17 may be mounted on the tongue 16 to support the tongue when the tongue is disconnected from a towing vehicle. Wheels 24, 25 are mounted on the axles 14, 15 and rest on a ground surface.

A suitable trailer 12 for the system 10 has a front 18 and a rear 19. The trailer 12 may comprise a frame 20 including a pair of frame members 22, with one of the frame members being laterally spaced with each member 22 being located toward a lateral side of the trailer and extending in a longitudinal direction of the trailer. The trailer may also include one axle 14, or a pair of axles with a rearward axle 15 and a forward axle 14. The system 10 is highly suitable for use with a double axle trailer, but is also employed on a single axle trailer as will be explained in greater detail below.

The trailer 12 may also include a suspension assembly 28 mounted on each of the frame members 22 of the trailer and having the axles 14, 15 mounted thereon to thereby support the frame 20 on the axles. Each of the suspension assemblies 28 may comprise a forward leaf spring 30 and a rearward leaf spring 31. The forward leaf spring 30 may have a forward end 32 with a forward eye 34 and a rearward end 36 with a rearward eye 38. The rearward leaf spring 31 has a forward end 33 with a forward eye 35 and a rearward end 37 with a rearward eye 39. The rearward leaf spring 31 may be located relatively rearwardly on the frame member 22 and the forward leaf spring 30 is located relatively forwardly on the frame member.

Each suspension assembly 28 may further comprise a forward spring mount 40 that mounts the forward end 32 of the forward leaf spring 30 on the frame member 22. The forward spring mount 40 may be mounted on the forward eye 34 of the forward leaf spring in a manner permitting pivotal movement of the forward leaf spring 30 with respect to the frame member. The suspension assembly 28 may further comprise a rearward spring mount 41 that mounts the rear end 37 of the rearward leaf spring 31 on the frame member 22. The rearward spring mount 41 may be mounted on the rearward eye 39 of the rearward leaf spring 31 in a manner permitting pivotal movement of the rearward leaf spring 31 with respect to the frame member 22. The rearward spring mount 41 may be spaced rearwardly from the forward spring mount 40.

Each suspension assembly 28 may also comprise a forward shackle mount 42 that is mounted on the rearward end 36 of the forward leaf spring 30. The forward shackle mount 42 may be mounted on the rearward eye 38 of the forward leaf spring, and the forward shackle mount may be pivotable with respect to the forward leaf spring. The suspension assembly 28 may also include a rearward shackle mount 43 that is mounted on the forward end 33 of the rearward leaf spring 31, and the rearward shackle mount may be pivotable with respect to the rearward leaf spring. The rearward shackle mount 43 may be mounted on the forward eye 35 of the rearward leaf spring. Each suspension assembly 28 may include a shackle link 44 that links the forward shackle mount 42 to the rearward shackle mount 43. The forward shackle mount 42 may be pivotable with respect to the shackle link 44, and the rearward shackle mount 43 may also be pivotable with respect to the shackle link. In some embodiments of the system 10, the shackle link may be a portion of an existing or preexisting suspension assembly, and in other embodiments, the shackle link may be a special part fabricated for the implementation of the system 10

A significant aspect of the system 10 is a trailer leveling apparatus 50 for adjusting a height of the frame 20 of the trailer above the ground surface. The trailer leveling apparatus 50 adjusts a distance between the axles 14, 15 and the trailer frame 20, and this may be accomplished by adjusting a distance between at least one of the mounting points on the suspension and the frame member 22. The trailer leveling apparatus 50 may be interposed between the frame member 22 of the frame and one or more of the suspension assemblies 28, and may preserve the original suspension positioning when the apparatus 50 is not being used to level the trailer, for the purpose of pulling the trailer over the road. However, the trailer leveling apparatus 50 may change the positioning of the suspension components with respect to the frame when leveling of the trailer is desired. The trailer leveling apparatus 50 may comprise a trailer leveling assembly 52 that is mounted on one, and preferably both, of the suspension assemblies 28 located on each lateral side of the trailer. Advantageously, the trailer leveling apparatus 50 may be applied to the suspension assembly 28 of an existing trailer, after manufacture, by disconnecting a portion of the suspension assembly from the frame and interposing the apparatus 50 between the portion of the suspension assembly and the frame.

The trailer leveling apparatus 50 may move the suspension assemblies between a traveling position and a leveling position. The traveling position (see FIG. 3) of the trailer leveling apparatus 50 may be characterized by the suspension being capable of supporting the frame 20 during movement of the trailer 12 along a road, and the leveling position (see FIG. 2) is characterized by the suspension being moved away from the frame member 22 with respect to the traveling position. In other words, the suspension assembly 28 (along with the respective axle) is positioned relatively closer to the frame member 22 when the apparatus 50 in the traveling position, and the suspension assembly is positioned relatively further away from the frame member 22 when the apparatus 50 in the leveling position. The leveling position is not necessarily one particular position, but positions in which the suspension is moved further away from the frame member than when in the traveling position.

Each of the trailer leveling assemblies 52 are mounted on one of the suspension assemblies 28. Each of the trailer leveling assemblies 52 may mount an end of one (in the case of a single axle trailer), or ends on each of the forward 30 and rearward 31 leaf springs (in the case of a double axle trailer) to the frame member 22. Each of the trailer leveling assemblies 52 may be interposed between one of the suspension assemblies 28 and the respective frame member 22. Each of the trailer leveling assemblies 52 is configured to increase and decrease a distance between one end of each of the leaf springs 30, 31 and the frame member 22, and may do so individually and independently of each other so as to raise and lower the lateral sides of the trailer in a manner that orients the trailer in a level orientation from one lateral side to the other lateral side.

In greater detail, each of the trailer leveling assemblies 52 may comprise a base structure 54 mounted on one of the frame members 22 of the trailer and a support structure 56 mounted on the base structure, with the support structure 56 being movable with respect to the base structure. The base structure 54 may be located on the frame member, and at a location that is medial between the forward spring mount 40 and the rearward spring mount 41. The base structure 54 may comprise a mounting portion 58 mounted on the frame member 22 of the trailer. The mounting portion 58 may include a flange plate 60 positioned against and mounted on the frame member 22. The base structure 54 may further comprise a first engagement portion 62 mounted on the mounting portion 58. The first engagement portion 62 may define a socket, and may have a lower opening 64 into an interior of the socket. The base structure 54 may also comprise a jacking assembly 66 that is configured to move the support structure 56 with respect to the base structure 54. The jacking assembly 66 may extend and retract the support structure 56 with respect to the base structure. The jacking assembly 66 may be located in the socket of the first engagement portion 62 to selectively push the support structure outwardly from the socket. The jacking assembly 66 may be of virtually any type, including a manually-operated jack or a power-operated jack, a crank-actuated jack or a hydraulic jack.

The support structure 56 may be movable away from and towards the frame member 22 on which the base structure 54 is mounted. The support structure 56 may be extendable and retractable with respect to the base structure using the jack assembly 66 or other suitable means. For example, actuation of the jack assembly 66 to extend the jack assembly causes the support structure to be extended with respect to the base structure, and actuation of the jack assembly to retract the jack assembly causes the support structure to retract with respect to the base structure. The support structure may comprise a suspension connection portion 68 connected to the suspension assembly, which may have the shackle link 44 mounted thereon. The shackle link 44 may be pivotally mounted on the suspension connection portion 68. The suspension connection portion 68 may also comprise a pair of side plates 70, 71, with the shackle link 44 being located between the side plates. The pair of side plates may be substantially parallel in orientation and may extend in substantially vertical planes. The suspension connection portion 68 may further comprise a top plate 72 that extends between and joins the side plates 70, 71. The suspension connection portion 68 may also include a mounting pin 73 that extends between the side plates to mount the shackle link 44 to the side plates.

The support structure 56 may further include a second engagement portion 74 that engages the first engagement portion 62 of the base structure 54. The second engagement portion 74 may be slidably received in the socket defined by the first engagement portion, and the second engagement portion may define a column that extends upwardly and is received by the socket of the first engagement portion. The column may be slidable in the socket of the first engagement portion. The support structure 56 may further include a connector portion 76 on which the suspension connection portion 68 and the second engagement portion 74 are mounted. The connector portion 76 may be located at a lowermost extent of the support structure 56, and may extend substantially horizontally. In some embodiments, the jacking assembly 66, the first engagement portion 62, and the second engagement portion 74 may comprise a modified tongue jack apparatus adapted for this application and connected to the mounting portion 58 of the base structure 54 and to the connection portion 76 of the support structure 56.

The support structure 56 may have a guidance portion for guiding movement of the support structure 56 with respect to the frame member 22, and may include a post 80 mounted on the suspension connection portion 68. The post 80 may extend upwardly from the suspension connection portion 68, and may be located on the top plate 72 of the suspension connection portion. The guidance portion may also have a tube 82 that is mounted on the frame member 22, with the post 80 extending into and being slidably movable in the tube 82 for guiding the movement of the support structure as the trailer leveling apparatus moves between the traveling position and the leveling positions, and back to the traveling position.

In some optional embodiments, the system 10 is configured to permit the jack to be removable from the system, or to permit a conventional jack to be used as a part of the system that can be removed when the trailer leveling capability of the system is not needed. As shown in FIGS. 4 through 7, some embodiments that are configured to removably receive the jack include a pair of first engagement portions 62, 84 in the base structure, and a pair of second engagement portions 74, 86 in the support structure. Positioned between the first engagement portions 62, 84 may be an upper bearing member 88, and positioned between the second engagement portions 74, 86 may be a lower bearing member 90. A jack receiving space may be defined between the upper 88 and lower 90 bearing members that is intended for receiving the jack so that the elements of the jack are able to push upwardly against the upper bearing member 88 and downwardly against the lower bearing member 90 in a coordinated manner that tends to move the members 88, 90 away from each other to movement suspension assembly 28 away from the frame member 22.

As an optional feature, a position lock assembly 92 may be employed to lock a position of extension of the support structure 56 with respect to the base structure 54. The position lock assembly 92 may include a pin 94 that is selectively insertable into a hole 96 formed in the first engagement portion 84 of the base structure and into one hole 98 of a plurality of holes formed in the second engagement portion 86 of the support structure when the hole 96 is brought into registration with one of the holes 98 at the desired positional relationship of the portions 62 and 74. The pin 94 may be removed from the holes 96, 98 when it is desired to release the portions 62 and 74 from the locked condition.

In other optional embodiments, an auxiliary structure 100 may be employed that permits the use of the system 10 with types of suspensions other than the leaf spring arrangement discussed previously, while providing similar functionality. The suspension may be mounted on the auxiliary structure 100, which may be mounted on the frame member 22. The auxiliary structure 100 may be movable with respect to the frame member 22, and may be pivotably movable with respect to the frame member. The auxiliary structure 100 may be connected to the support structure 56 such that movement of the support structure with respect to the base structure 54 moves at least a portion of the auxiliary structure 100 with respect to the frame member 22. This movement may cause the suspension to be moves away from and toward the frame member.

In greater detail, the auxiliary structure 100 may comprise an auxiliary support beam 102 that may be mounted on the frame member 22. The auxiliary support beam 102 has a first end portion 104 and a second end portion 106, and may be pivotable with respect to the frame member, The first end portion 104 may be pivotably mounted on the frame member 22, and the second end portion 106 may be connected to the support structure 56 such that movement of the support structure moves the second end portion of the auxiliary support beam with respect to the frame member. The second end portion may move away from and toward the frame member to thereby move the suspension away from and toward the frame member. It should be recognized that virtually any type of suspension element may be mounted on the auxiliary support beam 102, and in some implementations the axle may be mounted substantially directly on the auxiliary support beam with no suspension element therebetween, which is useful for those applications where the suspension elements are not mounted between the axle and the frame, but instead are mounted between the axle and the wheel hubs. This arrangement is used, for example, for torsion-based suspensions that utilize the twisting or deformation of elements such as metal or elastomeric materials situated between the axle and the wheel hub, and the axle would otherwise be mounted directly and solidly to the frame member 22.

The auxiliary structure 100 may also comprise a pivot mount 108 that pivotally mounts the auxiliary support beam 102 to the frame member 22. The pivot mount 108 may pivotally mount the first end portion 104 of the auxiliary support beam 102 to the frame member, leaving the second end portion 106 to move or rotate with respect to the frame member 22.

The system acts by adjusting the distance between the axles, and thus the wheels, and the frame member of the trailer. The adjustment is accomplished by adjusting the distance between one end of the leaf spring and the frame member, such as by adjusting the distance between the spring attachment point and the frame member by engaging a specialized drive mechanism. In the optional embodiment of FIGS. 9 and 10, the adjustment is accomplished by adjusting the distance between one end of the auxiliary support beam and the frame member. The embodiments of the system may be mechanically driven, hydraulically driven, or powered by a portable jack. By increasing the distance between the spring attachment point and the frame member, the suspension springs are pushed down and at least partially away from the frame member, and the trailer frame above the spring is raised with respect to the ground surface on which the wheel is resting. Upon raising the frame member with respect to the wheel and the ground surface using the trailer leveling assembly 52 associated with the side of the trailer of the frame member, the trailer may be effectively brought into a level orientation in a side to side manner. The process can be reversed until the spring attachment mechanism, road ready position stops, rest firmly against the trailer frame to return to a road-ready configuration.

The trailer leveling system 10 may be used by parking the trailer and determining the low side of the trailer on the ground surface at the location that the trailer is located. The jacking assembly 66 may be activated to increase the distance between one end of the leaf spring and the frame member on the low side of the trailer until the trailer reaches a level attitude from side to side. After the trailer is brought into a level side to side orientation, the trailer can be detached from the tow vehicle. The orientation of the trailer may then be leveled in a front to back direction using the jack located on the tongue of the trailer or the landing jacks on a fifth wheel trailer to render the parked trailer level in all directions. Reversing the trailer leveling process brings the trailer into a highway trailerable condition.

The system 10 avoids the need to use, for example, blocking material positioned below one or both of the wheels, which requires a user to guess the proper thickness of the blocking material and when not accurate had to reposition the trailer on thicker or thinner material to attain the desired result, assuming that the correct thickness of blocking material is available. The system 10 provides an virtually infinite range of adjustments between the extreme positions, to provide an adjustable, easy, and affordable solution to side to side trailer leveling. This is in contrast to the use of jacks positioned at the corners of the trailer frame and that add a considerable amount of weight to the trailer.

It should be appreciated from the foregoing description that, except when mutually exclusive, the features of the various embodiments described herein may be combined with features of other embodiments as desired while remaining within the intended scope of the disclosure.

With respect to the above description then, it is to be realized that the optimum dimensional relationships for the parts of the invention, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A trailer leveling system for adjusting a height of a frame of a trailer above a ground surface, the trailer leveling system comprising:
    at least one trailer leveling apparatus configured to adjust a distance between an axle of the trailer and the frame of the trailer, the at least one trailer leveling apparatus acting on a suspension of the trailer, the at least one trailer leveling apparatus moving the suspension between a traveling position and a leveling position, the traveling position being characterized by the suspension being capable of supporting the frame during movement of the trailer along a road, the leveling position being characterized by a position of the suspension being moved away from the frame with respect to the traveling position;
    wherein the suspension of the trailer includes at least one leaf spring, and wherein the at least one trailer leveling apparatus mounts an end of the at least one leaf spring to the frame of the trailer.

2. The trailer leveling system of claim 1 wherein the suspension of the trailer includes a pair of suspension assemblies located on opposite lateral sides of the trailer, the at least one trailer leveling apparatus comprising a pair of trailer leveling apparatuses, each trailer leveling apparatus acting on one of the suspension assemblies.

3. The trailer leveling system of claim 1 wherein the at least one trailer leveling apparatus is configured to increase and decrease a distance between the end of the at least one leaf spring and the frame of the trailer.

4. The trailer leveling system of claim 1 wherein the trailer leveling assembly comprises:
    a base structure configured to mount on a frame member of the frame of the trailer; and
    a support structure mounted on the base structure, the support structure being configured to have a portion of the suspension of the trailer mounted thereon, the support structure being movable with respect to the base structure.

5. The trailer leveling system of claim 4 wherein the support structure includes a suspension connection portion connected to the suspension, the suspension connection portion having a shackle link pivotally mounted thereon, the shackle link being pivotally mounted on at least one leaf spring of the suspension of the trailer.

6. The trailer leveling system of claim 4 wherein the base structure comprises a mounting portion for mounting on a frame member of the frame of the trailer; and a first engagement portion mounted on the mounting portion, the first engagement portion defining a socket; and wherein the support structure comprises a second engagement portion engaging the first engagement portion of the base structure, the second engagement portion being slidably received in the socket defined by the first engagement portion, the second engagement portion defining a column received by the socket of the first engagement portion.

7. The trailer leveling system of claim 4 additionally comprising a guidance portion for guiding movement of the support structure with respect to the frame member, the guidance portion comprising:
   a post mounted on the support structure; and
   a tube mounted on the frame member, the post being slidably movable in the tube.

8. The trailer leveling system of claim 1 wherein the at least one trailer leveling apparatus is configured to raise the frame of the trailer with respect to the ground surface from the traveling position to the leveling position.

9. A trailer leveling system for adjusting a height of a frame of a trailer above a ground surface, the trailer leveling system comprising:
   at least one trailer leveling apparatus configured to adjust a distance between an axle of the trailer and the frame of the trailer, the at least one trailer leveling apparatus acting on a suspension of the trailer, the at least one trailer leveling apparatus moving the suspension between a traveling position and a leveling position, the traveling position being characterized by the suspension being capable of supporting the frame during movement of the trailer along a road, the leveling position being characterized by a position of the suspension being moved away from the frame with respect to the traveling position;
   wherein the suspension of the trailer includes a forward leaf spring and a rearward leaf spring, and wherein the at least one trailer leveling apparatus mounts an end of each of the forward and rearward leaf springs to the frame of the trailer.

10. The trailer leveling system of claim 9 wherein the at least one trailer leveling apparatus is configured to increase and decrease a distance between the ends of the forward and rearward leaf springs and the frame of the trailer.

11. A trailer leveling system for adjusting a height of a frame of a trailer above a ground surface, the trailer leveling system comprising:
   at least one trailer leveling apparatus configured to adjust a distance between an axle of the trailer and the frame of the trailer, the at least one trailer leveling apparatus acting on a suspension of the trailer, the at least one trailer leveling apparatus moving the suspension between a traveling position and a leveling position, the traveling position being characterized by the suspension being capable of supporting the frame during movement of the trailer along a road, the leveling position being characterized by a position of the suspension being moved away from the frame with respect to the traveling position;
   wherein the trailer leveling assembly comprises:
      a base structure configured to mount on a frame member of the frame of the trailer; and
      a support structure mounted on the base structure, the support structure being configured to have a portion of the suspension of the trailer mounted thereon, the support structure being movable with respect to the base structure;
   wherein the base structure is located medially between a forward leaf spring and a rearward leaf spring.

12. The trailer leveling system of claim 11 wherein the at least one trailer leveling apparatus is configured to raise the frame of the trailer with respect to the ground surface from the traveling position to the leveling position.

13. A trailer leveling system for adjusting a height of a frame of a trailer above a ground surface, the trailer leveling system comprising:
   at least one trailer leveling apparatus configured to adjust a distance between an axle of the trailer and the frame of the trailer, the at least one trailer leveling apparatus acting on a suspension of the trailer, the at least one trailer leveling apparatus moving the suspension between a traveling position and a leveling position, the traveling position being characterized by the suspension being capable of supporting the frame during movement of the trailer along a road, the leveling position being characterized by a position of the suspension being moved away from the frame with respect to the traveling position;
   wherein the trailer leveling assembly comprises:
      a base structure configured to mount on a frame member of the frame of the trailer; and
      a support structure mounted on the base structure, the support structure being configured to have a portion of the suspension of the trailer mounted thereon, the support structure being movable with respect to the base structure;
   wherein the base structure includes a jacking assembly configured to move the support structure with respect to the base structure, the jacking assembly extending and retracting the support structure with respect to the base structure.

14. The trailer leveling system of claim 13 wherein the at least one trailer leveling apparatus is configured to raise the frame of the trailer with respect to the ground surface from the traveling position to the leveling position.

\* \* \* \* \*